US009797624B2

(12) United States Patent
Kim

(10) Patent No.: US 9,797,624 B2
(45) Date of Patent: Oct. 24, 2017

(54) HOT-AIR BLOWER USING HEAT LAMP

(71) Applicant: Do Hyung Kim, Daejeon (KR)

(72) Inventor: Do Hyung Kim, Daejeon (KR)

( * ) Notice: Subject to any disclaimer, the term of this patent is extended or adjusted under 35 U.S.C. 154(b) by 52 days.

(21) Appl. No.: 15/070,224

(22) Filed: Mar. 15, 2016

(65) Prior Publication Data

US 2016/0356526 A1 Dec. 8, 2016

(30) Foreign Application Priority Data

Jun. 8, 2015 (KR) .................. 10-2015-0080413

(51) Int. Cl.
| | | |
|---|---|---|
| *F24D 15/02* | (2006.01) | |
| *F24C 1/14* | (2006.01) | |
| *F24H 3/06* | (2006.01) | |
| *F24H 3/00* | (2006.01) | |
| *F24H 9/00* | (2006.01) | |
| *A01G 9/26* | (2006.01) | |

(52) U.S. Cl.
CPC ............. *F24H 3/06* (2013.01); *A01G 9/26* (2013.01); *F24H 3/002* (2013.01); *F24H 9/0073* (2013.01)

(58) Field of Classification Search
None
See application file for complete search history.

(56) References Cited

U.S. PATENT DOCUMENTS

| | | | | |
|---|---|---|---|---|
| 939,106 A | * | 11/1909 | Soles .................... | F24C 7/065 392/376 |
| 1,006,767 A | * | 10/1911 | Mauger ................. | A45D 20/10 392/385 |
| 1,674,017 A | * | 6/1928 | Marsden .............. | F24H 3/0417 392/361 |
| 1,846,233 A | * | 2/1932 | Van Daam .......... | F24H 3/0417 126/110 B |
| 1,961,772 A | * | 6/1934 | Martin ................. | A45D 20/14 392/375 |
| 2,041,897 A | * | 5/1936 | Benson ............... | F24H 3/0417 392/361 |
| 2,475,910 A | * | 7/1949 | Morrison ............ | F24H 3/0417 392/376 |

(Continued)

FOREIGN PATENT DOCUMENTS

| | | |
|---|---|---|
| JP | H03-267066 A | 11/1991 |
| KR | 10-0833171 B1 | 5/2008 |

(Continued)

OTHER PUBLICATIONS

Chunjinong Balhyonongsan, Building of a vinyl greenhouse, http://blog.naver.com/greenrev/150122356069, Oct. 26, 2011.

*Primary Examiner* — Thor Campbell
(74) *Attorney, Agent, or Firm* — KORUS Patent, LLC; Seong Il Jeong

(57) ABSTRACT

A hot-air blower comprises a heat lamp with a rated power consumption of 180 W to 380 W, a lampshade having a socket for the heat lamp, a cylindrical outer casing with an inner diameter larger than a largest outer diameter of the lampshade, a lampshade fixing part coupled with the lampshade and fastened to the outer casing to allow the lampshade to be provided on a central axis of the outer casing, an impeller generating an air flow by rotation, a waterproof motor coupled with the impeller to rotate the impeller, and a motor fixing part coupled with the waterproof motor.

1 Claim, 8 Drawing Sheets

(56) References Cited

U.S. PATENT DOCUMENTS

| | | | | |
|---|---|---|---|---|
| 3,692,977 | A * | 9/1972 | Duhamel | F24F 7/06 219/220 |
| 3,785,271 | A * | 1/1974 | Joy | F24F 13/078 219/220 |
| 3,864,547 | A * | 2/1975 | Ray | B23K 1/005 200/81.9 M |
| 5,793,019 | A * | 8/1998 | Boyle | F26B 3/283 219/400 |
| 6,205,677 | B1 * | 3/2001 | Yune | A45D 20/12 34/266 |
| 7,412,781 | B2 * | 8/2008 | Mattinger | F24H 3/0423 34/96 |
| 7,474,842 | B2 * | 1/2009 | Bergstein | F24H 3/0405 102/201 |
| 8,500,305 | B2 * | 8/2013 | O'Sullivan | F21V 23/0442 362/253 |
| 2010/0085759 | A1 * | 4/2010 | O'Sullivan | F21V 23/0442 362/294 |

FOREIGN PATENT DOCUMENTS

| | | |
|---|---|---|
| KR | 10-1074757 B1 | 10/2011 |
| KR | 10-1170317 B1 | 8/2012 |

\* cited by examiner

HOT-AIR BLOWER USING HEAT LAMP

CROSS-REFERENCE TO RELATED APPLICATIONS

This patent application claims priority under 35 U.S.C. §119 to Korean Patent Application No. 10-2015-0080413, filed on Jun. 8, 2015, in the Korean Intellectual Property Office, the disclosure of which is incorporated by reference herein in its entirety.

TECHNICAL FIELD

The disclosure concerns a hot-air blower, and more specifically, to a hot-air blower having a heat lamp emitting infra-red (IR) radiations, and a motor and impeller for circulating hot air in the greenhouse.

DISCUSSION OF RELATED ART

There are abundant plantations of grapes throughout the country. This makes some people think that growing grapes and managing plantations of grapes are not challenging. As a matter of fact, growing grapes and managing the plantations can be the most challenging agriculture. This is because grapes grow fruit in summer and ripe in fall, when it is the rainy season. When the moisture level increases, grapes get sickened by fungal diseases and the fruits may explode due to excessive moisture. Growing grapes in greenhouse, therefore, is the most popular method of cultivating grapes for farmers today. The greenhouses block rain and keep the moisture level low, allowing grapes to ripe with sweeter flavor and preventing them from being disrupted by fungal diseases.

Managing greenhouses takes diligent efforts and consistent care. The farmers turn on boilers in mid-December to harvest the ripened fruits in late April or early May. The farmers harvest the fruits by late July in order to avoid being caught in the rainy season. Typically, it takes about five months after turning on boilers to harvest the fruits.

Cultivating grapes in greenhouses does have several issues to be solved. Although blocking rain prevents fungal diseases from disrupting the fruits by keeping the moisture level low, there are bugs like mites that ruin the crops. Environmentally friendly pesticides can kill the bugs, but they are costly.

Boilers are being utilized as the hot-air blowers in greenhouses, allowing hot air to circulate inside them. Rising fuel costs overburden farmers.

Thus, a need exists for other approaches to obtain the same objects achieved by the use of boilers.

SUMMARY

According to an embodiment of the present disclosure, a hot-air blower uses, as a heat source, a heat lamp emitting IR radiations and circulates hot air in the greenhouse using a motor and impeller. The hot-air blower may be used, e.g., in greenhouses for growing tomatoes or grapes.

A hot-air blower comprises a heat lamp with a rated power consumption of 180 W to 380 W, a lampshade having a socket for the heat lamp, a cylindrical outer casing with an inner diameter larger than a largest outer diameter of the lampshade, a lampshade fixing part coupled with the lampshade and fastened to the outer casing to allow the lampshade to be provided on a central axis of the outer casing, an impeller generating an air flow by rotation, a waterproof motor coupled with the impeller to rotate the impeller, and a motor fixing part coupled with the waterproof motor, spacing the impeller apart from the lampshade at a predetermined distance, and fastened to the outer casing to allow the impeller to be provided on the central axis of the outer casing.

The lampshade may be formed to be longer than the heat lamp by ⅓ of the length of the heat lamp so that the heat lamp does not externally project while the heat lamp is coupled with the socket. The outer casing may receive the lampshade, the impeller, and the waterproof motor and has a first part where the waterproof motor is provided and a second part where the lampshade is provided, the first part smaller in diameter than the second part by ½₅ of the diameter of the second part. A crop protection net may be coupled to an end of the outer casing where the lampshade is provided.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the inventive concept will be described in detail with reference to the accompanying drawings. The inventive concept, however, may be modified in various different ways, and should not be construed as limited to the embodiments set forth herein. As used herein, the singular forms "a," "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present.

Figure 1:
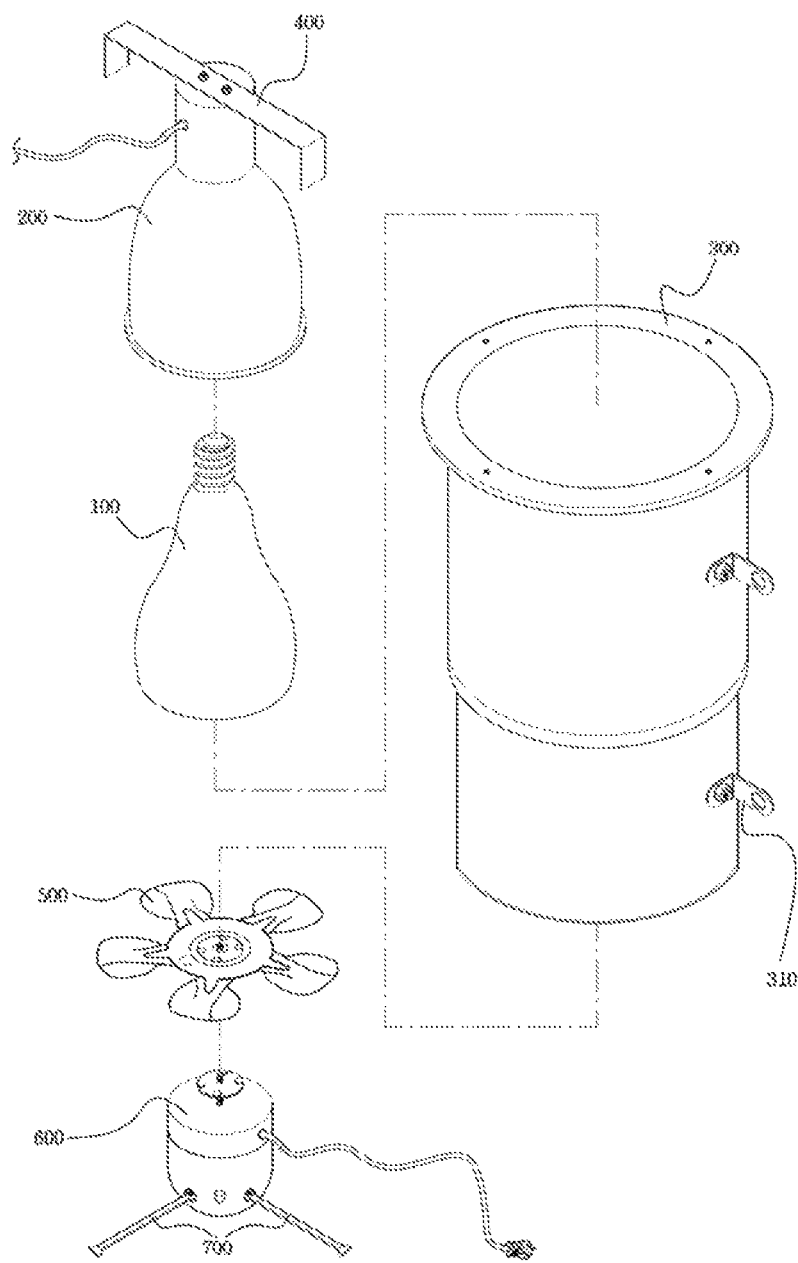
FIG. 1 is an exploded perspective view illustrating a hot-air blower using a heat lamp according to an embodiment of the present disclosure.
Figure 2:
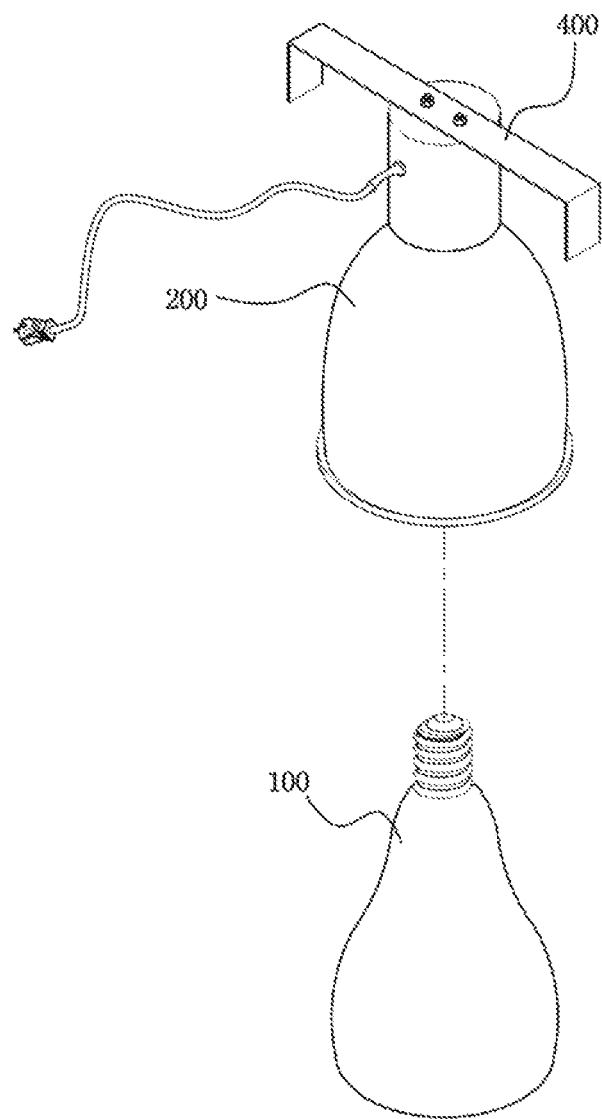
FIG. 2 is a perspective view illustrating the beat lamp, lampshade, and lampshade fixing part of FIG. 1, according to an embodiment of the present disclosure.
Figure 3:
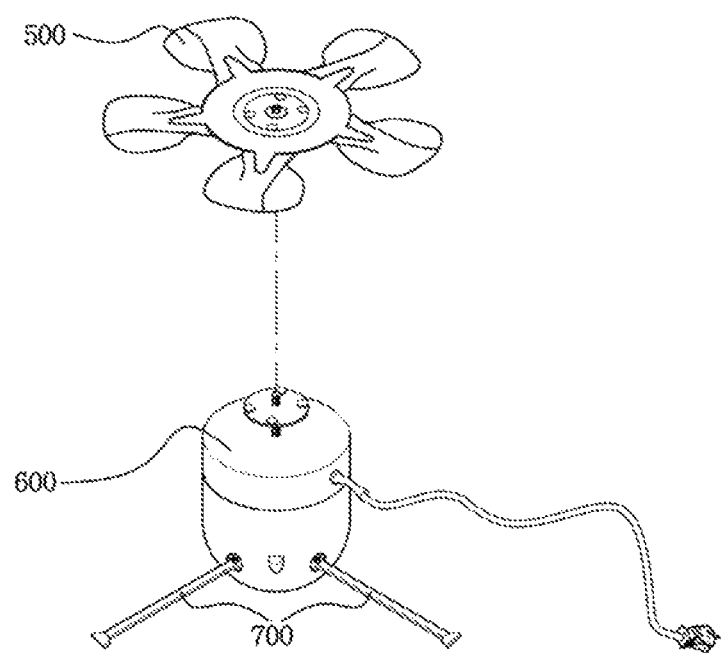
FIG. 3 is a perspective view illustrating the impeller, waterproof motor, and motor fixing part of FIG. 1, according to an embodiment of the present disclosure.
Figure 4:
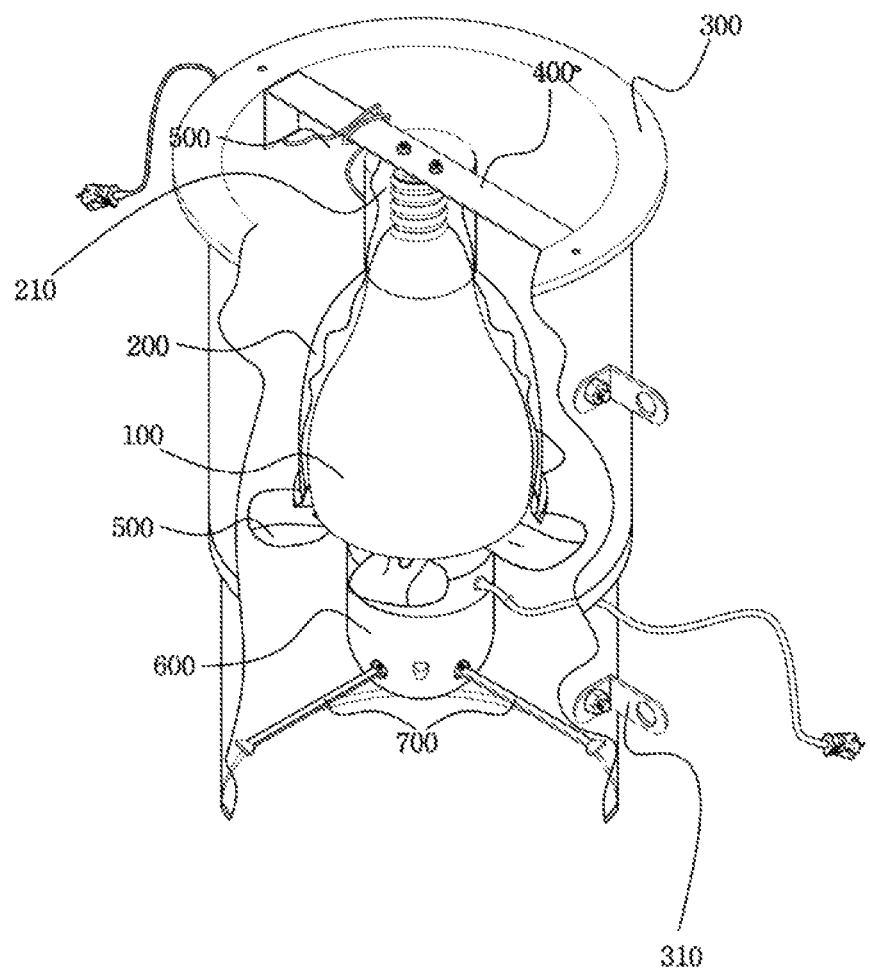
FIG. 4 is a partial cross-sectional view of the hot-air blower of FIG. 1, according to an embodiment of the present disclosure.
Figure 5:
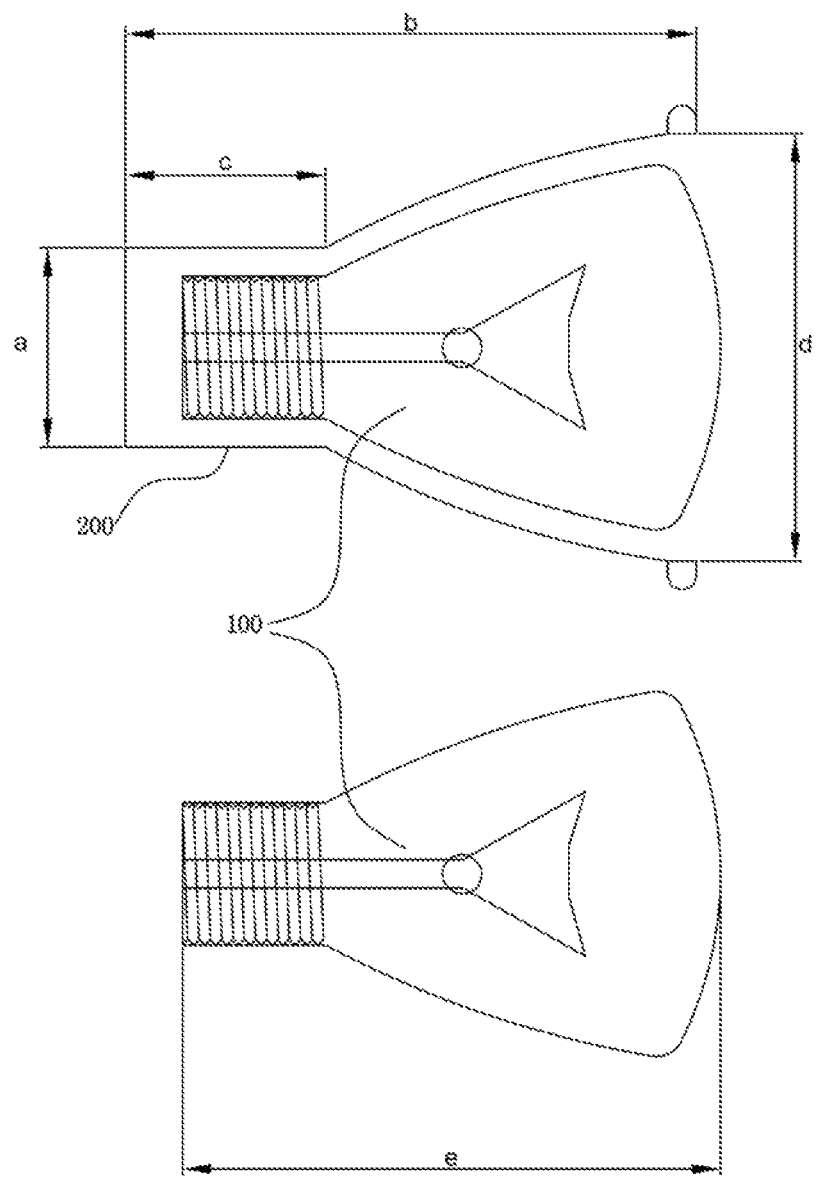
FIG. 5 is a cross-sectional view of the hot-air blower of FIG. 1, where the heat lamp and the lampshade are in assembly, according to an embodiment of the present disclosure.
Figure 6:
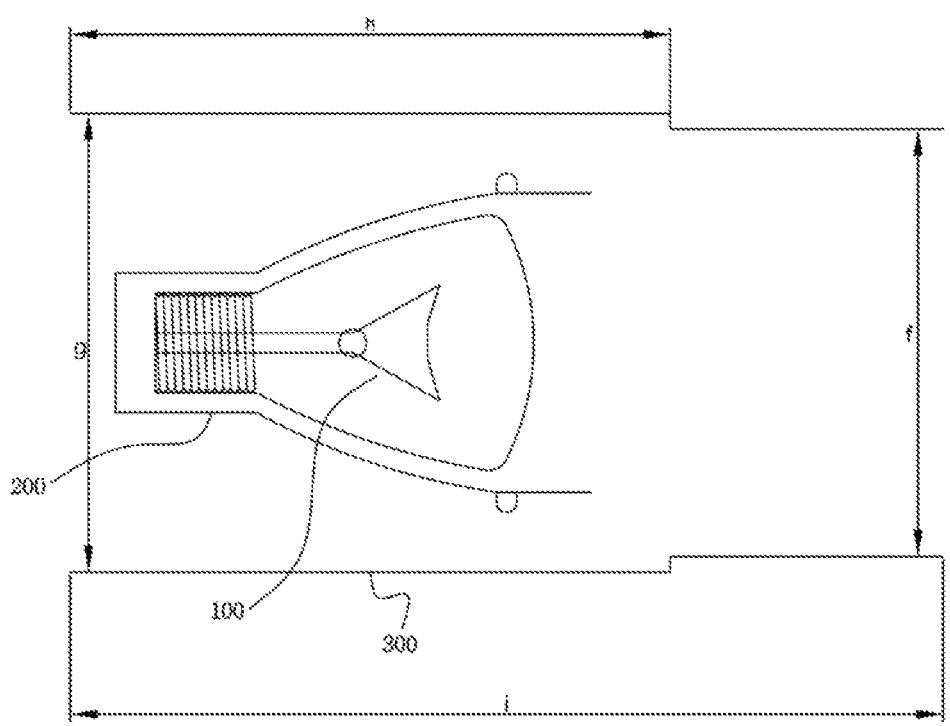
FIG. 6 is a cross-sectional view of the hot-air blower of FIG. 1, where the heat lamp, the lampshade, and the outer casing are in assembly, according to an embodiment of the present disclosure.
Figure 7:
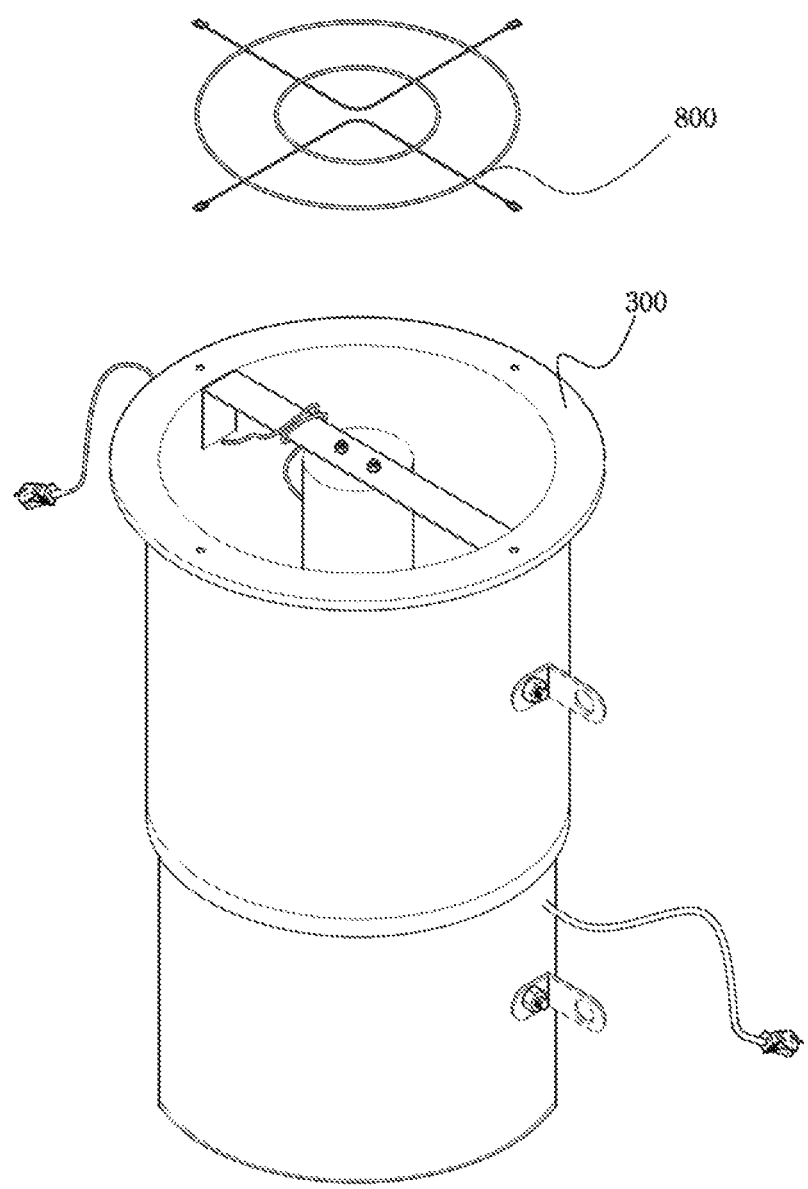
FIG. 7 is a perspective view illustrating the hot-air blower of FIG. 1 further including a crop protection net, according to an embodiment of the present disclosure.
Figure 8:
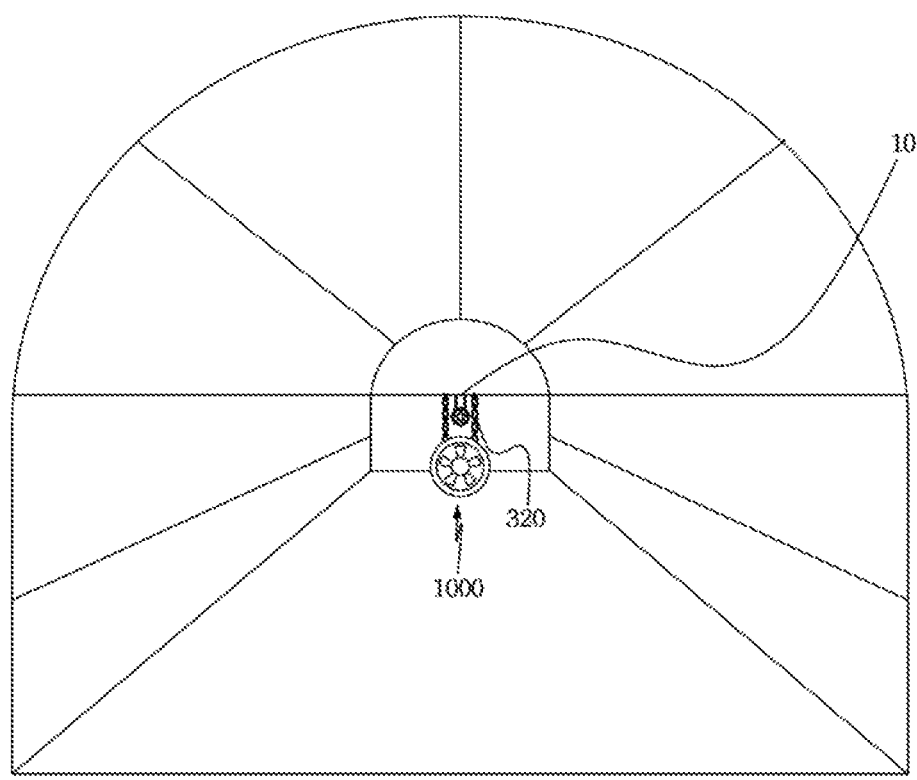
FIG. 8 is a view illustrating an example where a hot-air blower using a heat lamp is applied a greenhouse for growing tomatoes or grapes.

FIG. 1 is an exploded perspective view illustrating a hot-air blower using a heat lamp according to an embodiment of the present disclosure. FIG. 2 is a perspective view illustrating the heat lamp, lampshade, and lampshade fixing part of FIG. 1, according to an embodiment of the present disclosure. FIG. 3 is a perspective view illustrating the impeller, waterproof motor, and motor fixing part of FIG. 1, according to an embodiment of the present disclosure. FIG. 4 is a partial cross-sectional view of the hot-air blower of FIG. 1, according to an embodiment of the present disclosure. FIG. 5 is a cross-sectional view of the hot-air blower of FIG. 1, where the heat lamp and the lampshade are in assembly, according to an embodiment of the present disclosure. FIG. 6 is a cross-sectional view of the hot-air blower of FIG. 1, where the heat lamp, the lampshade, and the outer casing are in assembly, according to an embodiment of the present disclosure. FIG. 7 is a perspective view illustrating the hot-air blower of FIG. 1 further including a crop protection net, according to an embodiment of the present disclosure. FIG. 8 is a view illustrating an example where a hot-air blower using a heat lamp is applied to a greenhouse for growing tomatoes or grapes.

Referring to FIGS. 1 to 3, a hot-air blower 1000 using a heat lamp includes a heat lamp 100, a lampshade 200, an outer casing 300, a lampshade fixing part 400, an impeller 500, a waterproof motor 600, and a motor fixing part 700.

The heat lamp 100 has a rated power consumption of 180 W to 380 W.

When the rated power consumption (output) of the heat lamp 100 is relatively low (e.g., about 100 W), it does not help growing the crop, and when the rated power consumption (output) is relatively high (e.g., about 500 W), it may burn the crop.

According to the inventor's experiment, the heat lamp 100, when its rated power consumption is about 250 W, may grow well the crop.

For example, the heat lamp 100 may be coupled with a normal or standard socket using an E26 base and may use a rated input voltage of 220V.

The heat lamp 100 may have an average lifetime of about 2000 hours. The lifetime of the heat lamp 100 may be varied depending on voltages used. The heat lamp 100 may radiate a large amount of IR radiation. The IR radiation may permeate into an object (e.g., a crop) to absorb moisture of the crop and enforce immunity against the disease of the crop.

The heat lamp 100 may be used as a heat source instead of a boiler, and the IR radiation may prevent the crop from damaged by disease and insects with the reduced use of, e.g., eco-friendly agricultural chemicals.

As illustrated in FIG. 4, the lampshade 200 includes a socket 210 for the heat lamp 100.

As illustrated in FIG. 5, the lampshade 200 may be formed to be longer than the heat lamp 100 to prevent the heat lamp 100 from projecting to the outside of the lampshade 200 while the heat lamp 100 is coupled to the socket 210.

For example, the socket 210 may be a standard E26 base socket. The diameter (a) of a first end of the lampshade 200 that is positioned at a side of the socket 210 may be about 7 cm, and the length (b) between the first end of the lampshade 200 and a second end of the lampshade 200 may be about 20 cm. The second end of the lampshade 200 may be an opened end. A cylindrical portion of the lampshade 200, in which the socket 210 is positioned, may have a length (c) of about 7 cm, and the second end of the lampshade 200, which is opened, may have a diameter of about 15 cm. The length (e) of the heat lamp 100 may be about 15 cm. For example, the above measures of the lampshade 200 may be appropriate to supply heat generated from the heat lamp 100 to the inside of the greenhouse while blocking light leakage to the crop that may otherwise hamper the fertilization of the crop.

The outer casing 300 may be shaped as a cylinder and having an inner diameter larger than a largest outer diameter of the lampshade 200.

The outer casing 300 may accommodate the lampshade 200, the impeller 500, and the waterproof motor 600. The outer casing 300 may have a first cylindrical portion where the waterproof motor 600 is provided and a second cylindrical portion where the lampshade 200 is provided, wherein the first portion is larger in diameter than the second portion.

The outer casing 300 may have a step between the first portion and the second portion. According to an embodiment of the present disclosure, the outer casing 300 may be formed to have multiple steps.

Referring to FIG. 6, the diameter (f) of the first cylindrical portion of the outer casing 300 may be about 24 cm, and the diameter (g) of the second cylindrical portion of the outer casing 300 may be about 25 cm. The length (h) of the first cylindrical portion may be about 26 cm, and the length of the overall outer casing 300 may be about 40 cm. Such measures of the outer casing 300 are appropriate for accommodating the lampshade 200, the impeller 500, and the waterproof motor 600 in the outer casing 300 to transfer heat generated from the heat lamp 100 to the inside of the greenhouse using the impeller 500 and the waterproof motor 600.

Referring to FIG. 1, the outer casing 300 may further include a chain coupler 310 on the outer surface thereof to couple with a chain 320.

For example, the chain coupler 310 may be formed on the outer surface of the outer casing 300 to allow the outer casing 300 to connect through the chain 320 with a horizontal frame provided about 140 cm to about 150 cm above the ground, as illustrated in FIG. 8. The chain may be formed of a flexible or elastic material.

The coupling via the flexible chain may prevent injury to the work that may occur when the outer casing 300 is otherwise fastened to the outer casing 300 by way of a hard material.

The lampshade fixing part 400 may be coupled with the lampshade 200 and may be fastened to the outer casing 300 so that the lampshade 200 is positioned on a central axis of the outer casing 300.

The lampshade fixing part 400 may be shaped as a bracket. The lampshade 200 may be coupled to a central portion of the lampshade fixing part 400, and the outer casing 300 may be connected to two opposite ends of the lampshade fixing part 400 so that the lampshade 200 may be provided on the central axis of the outer casing 300 as illustrated in FIG. 2.

When the lampshade 200 is positioned on the central axis of the outer casing 300, the heat generated from the heat lamp 100 may be evenly spread.

The impeller 500 rotates to generate an air flow.

As the impeller 500, a known fan may be used. The impeller 500 may be formed of, e.g., aluminum or stainless steel for preventing corrosion.

Referring to FIG. 3, the waterproof motor 600 is connected with the impeller 500 to rotate the impeller 500.

The waterproof motor 600 may be formed of waterproof components to be protected from moisture or water from, e.g., a sprinkler.

As illustrated in FIGS. 3 and 4, the motor fixing part 700 may be connected with the waterproof motor 600 and fastened to the outer casing 300 to space the impeller 500 apart from the lampshade 200 at a predetermined distance while positioning the impeller 500 on the central axis of the outer casing 300.

The motor fixing part 700 may fasten the waterproof motor 600 connected with the impeller 500 to the outer casing 300.

Accordingly, the impeller 500 may be prevented from colliding with the lampshade 200. Further, heat radiation from the heat lamp 100 to the back side of the impeller 500 may be minimized which may occur when the lampshade 200 is positioned close to the impeller 500.

Referring to FIG. 7, the hot-air blower 1000 may further include a crop protection net 800 at an end of the outer casing 300 to prevent the crop from coming in the inside of the outer casing 300.

Referring to FIG. 8, the greenhouse may be about 300 cm to about 450 cm high from the ground, and the horizontal frame 10 of the greenhouse may be positioned about 140 cm to about 150 cm above the ground. In this case, a plurality of hot-air blowers 1000 may be installed in the greenhouse, and each hot-air blower 1000 may be installed about 120 cm to about 140 cm above the ground. The distance between two adjacent ones of the plurality of hot-air blowers 1000 may be about 16 m or less, and one hot-air blower 1000 per about 1067.5 square feet is provided in the greenhouse.

For the purpose of description, the greenhouse may measure 6 m wide, 80 m long, 3.3 m high at its central portion, 1.8 m high at its shoulder, and 0.4 m deep, for example, when the greenhouse is for growing fruits.

A plurality of hot-air blowers 1000 may be arranged at the interval of 16 m or less in a row along a groove in the field under the greenhouse. For example, the hot-air blowers 1000 may be positioned 8 m, 24 m, 40 m, 56 m, and 72 m away from an end of the greenhouse.

According to embodiments of the present disclosure, a heat lamp is used as a heat source, provide costs savings as compared with when a boiler is used as the heat source.

Infra-red (IR) radiations generated from the heat lamp may lead to reduced use of eco-friendly agricultural chemicals or pesticide.

The hot-air blower may be installed more easily than a boiler, leading to cost savings. The hot-air blower may be easily replaced even without expertise.

The outer casing may be fastened by the chain (e.g., a flexible chain), preventing injury to the worker.

Hot-air blowers may be positioned every 16 m interval about 120 to about 140 cm above the ground so that one hot-air blower per about 1067.5 square feet may be provided in the greenhouse, thereby leading to maximized crop yields relative to power consumption.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A hot-air blower, comprising
a heat lamp with a rated power consumption of 180 W to 380 W;
a lampshade having a socket for the heat lamp;
a cylindrical outer casing with an inner diameter larger than a largest outer diameter of the lampshade;
a lampshade fixing part coupled with the lampshade and fastened to the outer casing to allow the lampshade to be provided on a central axis of the outer casing;
an impeller generating an air flow by rotation;
a waterproof motor coupled with the impeller to rotate the impeller; and
a motor fixing part coupled with the waterproof motor, spacing the impeller apart from the lampshade at a predetermined distance, and fastened to the outer casing to allow the impeller to be provided on the central axis of the outer casing, wherein the lampshade is formed to be longer than the heat lamp by ⅓ of the length of the heat lamp so that the beat lamp does not externally project while the heat lamp is coupled with the socket, wherein the outer casing receives the lampshade, the impeller, and the waterproof motor and has a first part where the waterproof motor is provided and a second part where the lampshade is provided, the first part smaller in diameter than the second part by ¹⁄₂₅ of the diameter of the second part, and wherein a crop protection net is coupled to an end of the outer casing where the lampshade is provided.

* * * * *